United States Patent [19]

Faurie et al.

[11] Patent Number: 4,665,600

[45] Date of Patent: May 19, 1987

[54] AUTOMATIC DEVICE FOR PROCESSING A PRODUCT

[75] Inventors: Andre Faurie, Arcachon; Jean-Marie Pedone, Talence, both of France

[73] Assignee: La Cellulose du Pin, Bordeaux, France

[21] Appl. No.: 561,522

[22] Filed: Dec. 15, 1983

[30] Foreign Application Priority Data

Dec. 17, 1982 [FR] France .................. 82 21177

[51] Int. Cl.⁴ .................. B05C 5/00; B41F 17/20
[52] U.S. Cl. .................. 29/33 K; 101/35; 346/75; 901/29; 901/45; 901/46; 901/43
[58] Field of Search .................. 29/26 R, 568, 33 R, 29/33 K; 101/35, 36, 38 R; 400/126; 346/75; 414/736, 749, 753; 901/16, 37, 45, 46, 47, 42, 43, 29

[56] References Cited

U.S. PATENT DOCUMENTS

| | | | |
|---|---|---|---|
| 2,819,669 | 1/1958 | Glunz | 101/35 |
| 3,364,850 | 1/1968 | Bodor | 101/35 |
| 3,584,573 | 6/1971 | Teplitz | 101/35 |
| 3,885,295 | 5/1975 | Engelberger et al. | 901/46 X |
| 3,984,006 | 10/1976 | Takeyasu et al. | 901/45 |
| 4,042,161 | 8/1977 | Ando | 901/42 X |
| 4,146,900 | 3/1979 | Arnold | 346/75 |
| 4,172,429 | 10/1979 | Gregorec et al. | 101/35 X |
| 4,332,066 | 6/1982 | Hailey et al. | 29/26 R |
| 4,379,427 | 4/1983 | Middel et al. | 101/35 |
| 4,444,534 | 4/1984 | Bergman | 409/221 X |
| 4,445,273 | 5/1984 | Van Brussel et al. | 901/45 X |

FOREIGN PATENT DOCUMENTS

| | | |
|---|---|---|
| 2445559 | 4/1975 | Fed. Rep. of Germany . |
| 2625933 | 12/1976 | Fed. Rep. of Germany . |
| 2751186 | 5/1979 | Fed. Rep. of Germany . |

*Primary Examiner*—Z. R. Bilinsky
*Attorney, Agent, or Firm*—Oblon, Fisher, Spivak, McClelland, & Maier

[57] ABSTRACT

The invention relates to an automatic device for processing a product. The device provides an industrial robot with angular movements that drives at the end of its wrist (24) along a programmed rough path a working system (1), a guiding device (11) which provides the exact course desired for the working system (1), a damping system (25) placed between the wrist (24) of the robot and the working system (1), this damping system (25) compensating for the course deviations between the programmed course and the exact desired course. The device can be used for the marking of various products and particularly for the marking of paper reels.

11 Claims, 5 Drawing Figures

FIG_2

FIG_3

AUTOMATIC DEVICE FOR PROCESSING A PRODUCT

BACKGROUND OF THE INVENTION

1. Field of the Invention

This invention relates to the automatic processing of products. By automatic processing is meant one or more mechanical operations performed with an industrial robot, i.e., a device having a strictly mechanical portion having an articulated mechanical structure and a system of actuators, a data processing portion having sensitive detectors, and a system for processing information that receives the signals picked up by the detectors and that gives orders to the actuators. More particularly, the invention relates to an automatic device including an industrial robot and a system for processing a product also called a working system.

2. Description of the Prior Art

The industrial robot is an automatic device which is increasingly used to perform varied processing on diversified products. There are various types of industrial robots, among which the robots with angular movements are the most widely used. In the case of processing a product requiring the following of predetermined paths, a problem encountered in the use of these industrial robots with angular movements is the impossibility of their moving along a perfectly smooth path. Actually, the robot is an articulated system and its wrist describes a series of incremental movements, each of which is shorter as the number of programming points increases. Unless an infinity of points is programmed, which is impossible, the path of the wrist of the robot cannot move along a perfectly smooth path, and except in special cases, the wrist cannot move along a continuous path parallel to the surface to be worked. It is even more difficult for it to follow a path parallel to the surface to be worked, while remaining, in addition, at a constant distance from another reference surface.

SUMMARY OF THE INVENTION

One of the objects of the invention is provision of an automatic device comprising an industrial robot with angular movements, and at least a processing or working system, this device using the shape of the product to be processed to define the desired path of the working system.

The automatic device according to the invention includes an industrial robot driving at the end of its wrist the working system, the movement of the wrist being along a programmed rough course, a guiding device which provides the exact course for the working system, and a damping system placed between the wrist of the industrial robot and the working systems, this damping system compensating for the course deviations between the programmed course and the desired course.

According to an embodiment of the device, the guiding device includes a feeler which rests against at least one surface of the product to be treated, which gives a desired regularity to the processing.

A particularly advantageous application of the automatic device of the invention is its use for the printing of products and particularly their marking, and although the invention is applicable to widely diverse automatic processing on very diversified products, out of concern for simplification, the following description will refer essentially to the marking of products and particularly to the marking by jets of ink, associated if necessary with another process.

Marking by jets of ink consists of spraying ink according to given sequences from several nozzles aligned to form ink points which define printing characters.

The automatic device according to the invention then comprises a working system which is a marking head and it makes possible the marking of bodies or products surrounded by surfaces of very diversified shapes that can be printed or which themselves exhibit these surfaces, the marking being done optionally at several differently oriented positions. In addition to a great flexibility of use, this device provides very regular lettering.

In the paper industries, it is customary to mark the paper reels on the edge and the roll. The device of the invention equipped with a marking head makes this printing possible in several positions, automatically. Thus, it makes possible the marking on the edge, by resting against it, the lettering being done along the arcs of a circle centered on the axis of the reel. This is advantageous because the markings provided by the marking of the reel can last until the end of the emptying of the reel.

It also makes possible the marking on the roll parallel to the edge, by resting simultaneously against two surfaces of the reel, namely the roll and the edge.

Advantageously, there can be associated with the marking head a second working system, for example a label-placing system.

There can also be associated with the marking head a system which uses identical reference points for its positioning. Thus, there can be associated with the marking head mounted on its damping system, a capping system. Actually, it is customary to introduce a cap which can, in fact, be a crown, on each side of the spindle of the paper reel to increase the resistance to deformation of the paper reel. The capping is then done advantageously at the same processing station of the paper reel as that of the marking, and following a locating of the center of the reel, this locating being used for the marking on the cut edge.

BRIEF DESCRIPTION OF THE DRAWINGS

Various other objects, features and attendant advantages of the present invention will be fully appreciated as the same becomes better understood from the following detailed description when considered in connection with the accompanying drawings in which like reference characters designate like or corresponding parts throughout the several views are wherein.

DETAILED DESCRIPTION OF THE PREFERRED EMBODIMENTS

Figure 1:
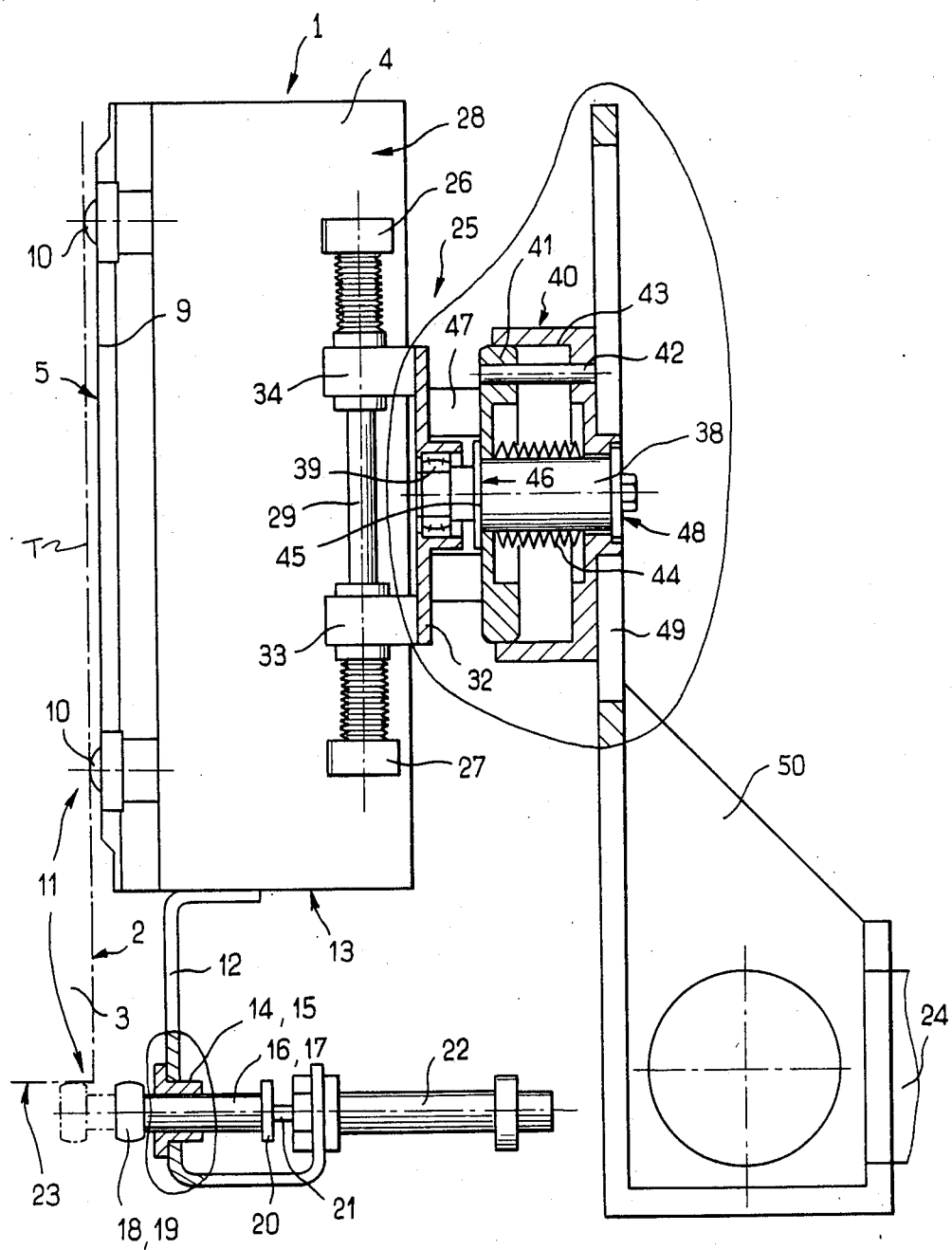
FIG. 1 show a marking system mounted at the end of the wrist of a robot in an embodiment of the device according to the invention, in a partially sectioned elevation.
Figure 2:
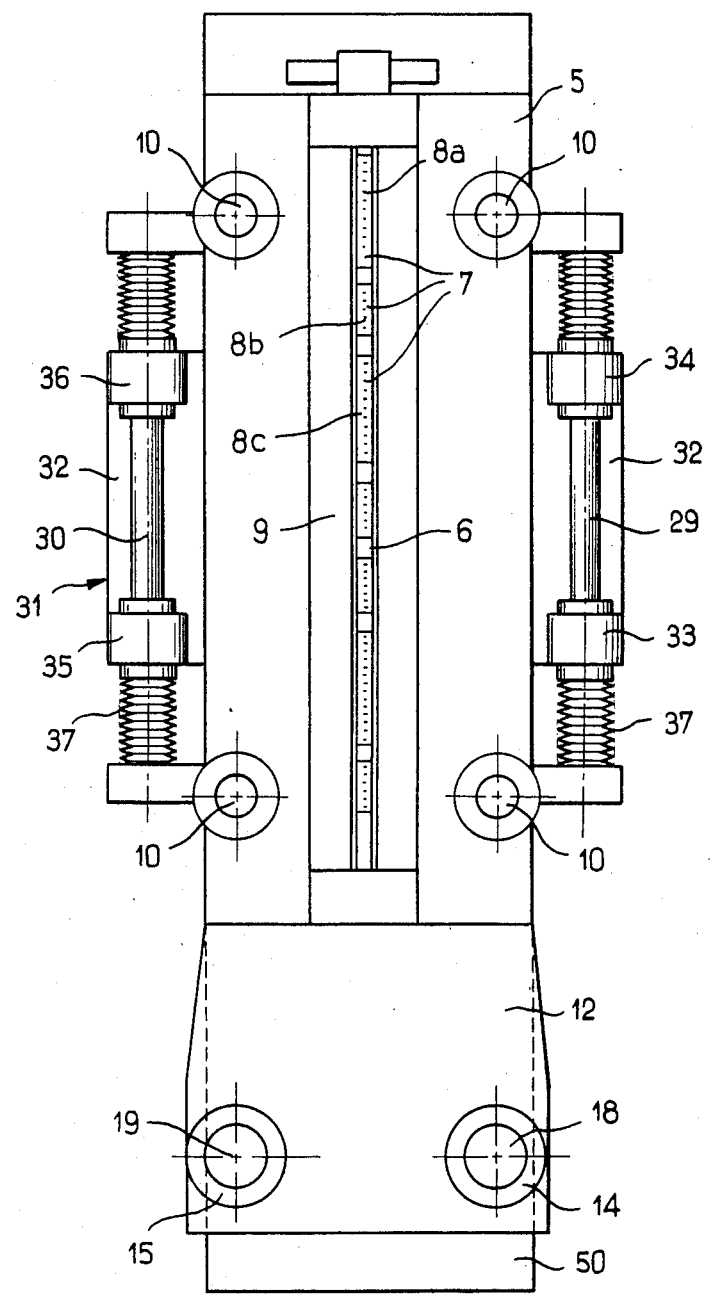
FIG. 2 shows a front view of the structure of FIG. 1.
Figure 3:
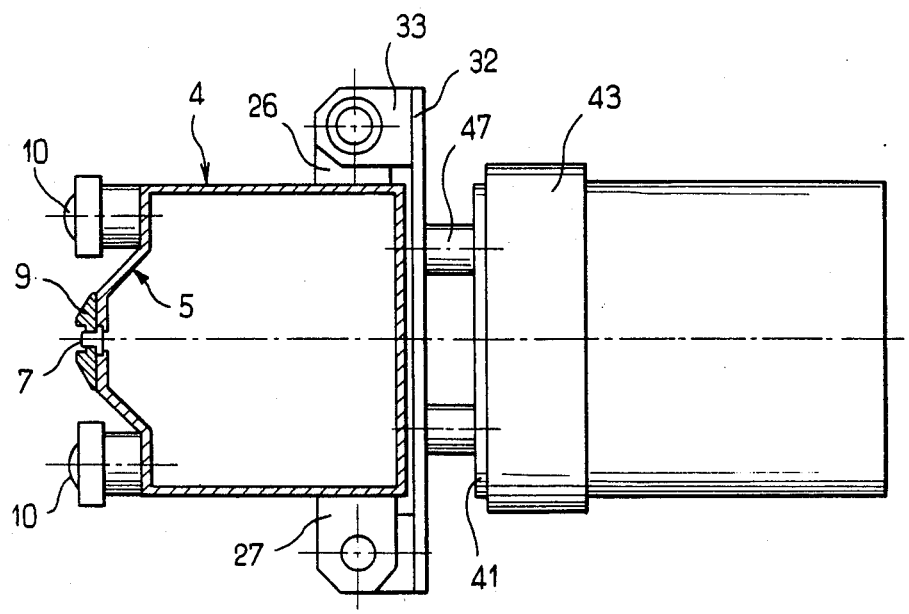
FIG. 3 shows the structure of FIG. 1 in a partially sectioned side view.

In FIGS. 1, 2 and 3, marking system 1, shown in a working position for the marking of roll 2 of a paper reel 3 includes a box 4 provided on its lower face 5 with a long central slot 6 that extends over the major part of its length, in which nozzles 7 are aligned for printing by jets of ink. These nozzles, numbering about sixty, are arranged by groups 8a, 8b, 8c etc., separated by spaces corresponding to the spaces between lines, each group being able to form a lettering character, the nozzles are fixed in the slot and are protected by a projection 9 fastened to the box. Each nozzle is connected to a reserve of ink by tubing (not shown). Its supply is controlled by a solenoid valve, itself controlled by a microprocessor (not shown).

Mounted at the four corners of the lower face of the box, surrounding the slot, roller balls 10 serve as contacts on the surface to be marked. These four balls form a feeler and are part of guiding device 11 for the marking system; thus, they keep the marking system in position and particularly keep the nozzles at a constant and desired distance from the surface to be marked.

An arm 12, mounted at an end 13 of box 4 carries two bearings 14 and 15 through which two rods 16 and 17 pass, each ending in a caster 18 or 19. A brace 20 connecting the two rods 16 and 17 is mounted at the end of rod 21 of a pneumatic jack 22. This unit as well as the four balls mentioned above are part of the guide device 11. With the previously described mounting, the casters 18 and 19 can take two positions:

1. A rest position which corresponds to a retraction of rod 21 of jack 22, the casters then being behind the touching plane T defined by the end of the four balls of the feeler, and 2. A work position corresponding to the end of the outward throw of rod 21 of jack 22, casters 18 and 19 then being in front of previously defined touching plane T. In this work position, the two casters are applied against edge 23 of paper reel 3 as indicated below, while the four balls of the feeler are applied on roll 2 of the reel.

The connection between wrist 24 of the industrial robot and the marking system is provided by a compensation or damping system 25. This system includes, mounted rigidly on each of the two lateral faces 28 of the box, two bearings 26 and 27 which carry two longitudinal rods 29 and 30 extending parallel to the axis of slot 6. On each set of these two rods is mounted a slide unit 31 including a plate 32 equipped with four eyelets 33, 34, 35 and 36. Between the eyelets and the bearings 26 and 27 is placed an elastic clearance system such as spring washers 37. This system allows a longitudinal compensation of movements of the slide unit along rods 29 and 30. The slide also has a shaft 38 extending perpendicular to plate 32 and which carries this plate by a spherical ball bearing 39 mounted at the end of the shaft 38, making possible an oscillating movement of plate 32 in relation to shaft 38. On this shaft 38 is also mounted a guiding unit 40 formed of a disk 41 pierced with holes for the passage of several guide rods 42, for example three, parallel to shaft 38 and a drum 43 carrying these guide rods.

Spring washers 44 surrounds shaft 38 between disk 41 and drum 43. Drum 43 is fastened in translation in relation to shaft 38 while the disk can move along the shaft, this movement being limited on one side by a stop 45 mounted on a collar 46 of shaft 38 and on the other by the elasticity of washers 44. Disk 41 and plate 32 are connected by a torsionally elastic system made of three block cylinders 47, which limit the circular clearance of plate 32 in relation to shaft 38. End 48 of shaft 38 is mounted to slide in a window 49 of a structure 50 carried by wrist 24 of the robot.

This system of mounting provides elastic compensation for the marking system in several directions:

1. A first compensation for linear movements in the longitudinal direction, along rods 29 and 30, i.e., parallel to the slot carrying the nozzles, due to spring washers 37, 2. A second compensation for linear movements along shaft 38, perpendicular to the first, and to the surface to be marked, due to spring washers 44, These two systems providing compensation amplitudes of several centimeters.

3. Two directional circular (or torsional) compensations due to the cylinder blocks 47 and the spring washers.

The structure carried by the wrist of the robot is equipped with two end of travel position switches, not shown, whose signals are sent to the control unit of the robot.

The industrial robot, not shown in the figures, is for example an industrial robot of the IRB 60 type, with 6 axes, marketed by the ASEA company. This robot provides in a known way a control unit based on microcomputers.

Figure 4:
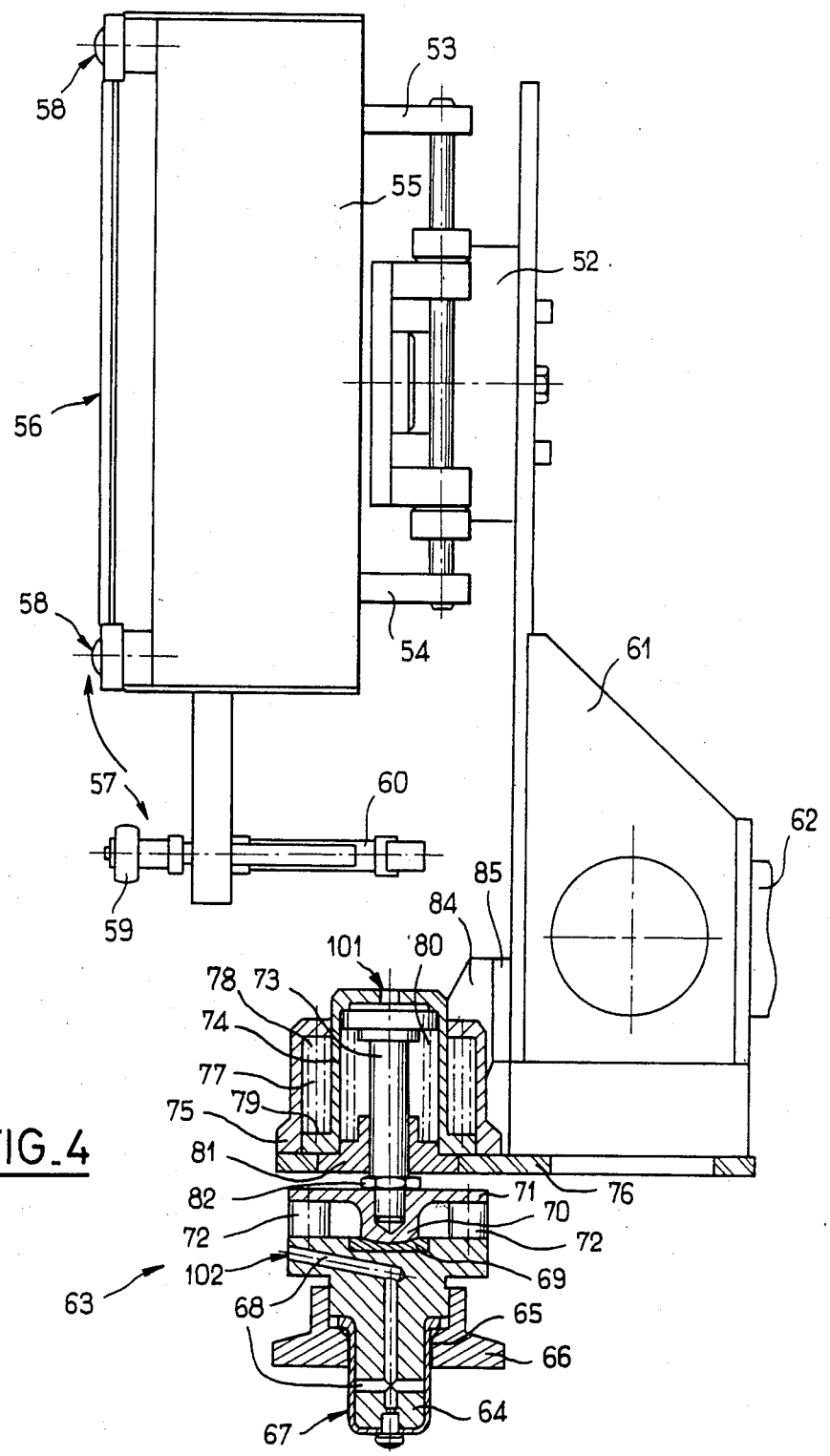
FIG. 4 shows a marking system associated with a capping system in a partially sectioned elevation.
Figure 5:
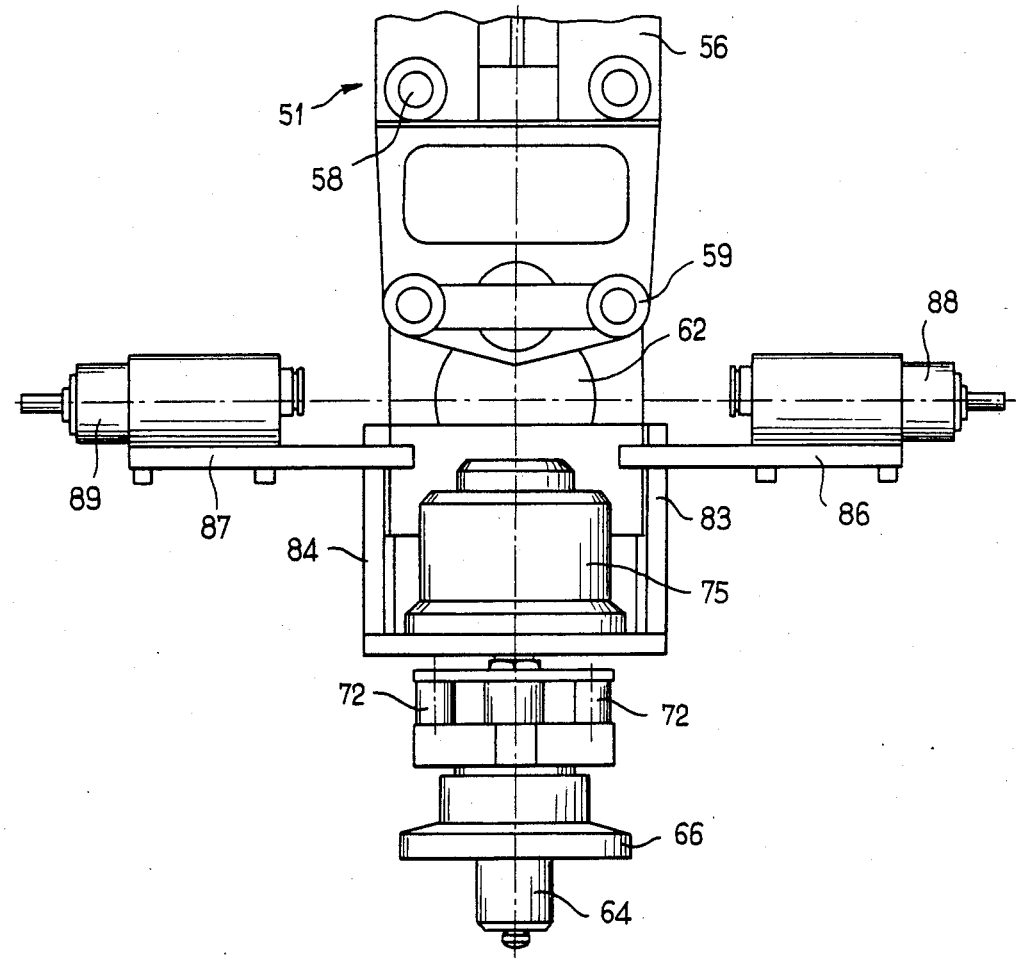
FIG. 5 shows a portion of the marking and capping system of FIG. 4 in a side view.

FIGS. 4 and 5 show a device equipped with a marking system for paper reels, associated with a system for capping the spindles of paper reels.

Marking head 51 and damping system 52 on which it is mounted have structures equivalent to those described with reference to FIGS. 1, 2 and 3. In this embodiment, bearings 53 and 54 are mounted on face 55 of the marking head opposite lower face 56 provided with marking nozzles, which reduces the bulk of the system to be used. Guiding device 57 also has roller balls 58 located on the lower face 56 of the marking box and a set of two retractable casters 59 activated by a jack 60 which during the marking of the roll, rest against the edge of the reel.

A capping system 63 is mounted on structure 61 carried by wrist 62 of the robot. This system has a capholding nose 64 around which is mounted, kept in position with a ring 65 and a nut 66, an elastic membrane 67 inflatable by air arriving through a tube, not shown, in communication with a solenoid valve, connected to input 101 of pipes 68. The nose is equipped with an insert 69 exhibiting a spherical surface 70 on which a rod tip 71 can swivel. Between tip 71 and nose 64 are located cylinder blocks 72. The tip is screwed on a rod 73 placed in a cylinder 74, itself surrounded by a counter-cylinder 75. The counter-cylinder is mounted screwing on a mounting plate 76 fastened to the end of structure 61 carried by wrist 62 of the robot. Between cylinder 74 and counter-cylinder 75 is placed a first elastic spring 77 resting on the bottom 78 of the counter-cylinder and on base 79 of the cylinder. A second elastic spring 80 is placed inside cylinder 74 between rod 73 and a ring 81 fastened on the cylinder. A lock nut 82 keeps rod 73 fixed in sleeve 71. Two inserts 83 and 84 fastened on mounting plate 76 and structure 61, here by an attachment plate 85, carry on both sides of the counter-cylinder, two supports 84 and 87 for position switches 88 and 89.

The device operates in the following manner. A paper reel placed on the roll arrives at the capping and marking station. The rough movements of the wrist of the robot being programmed in a known way, the capping system will grasp a cap. The cap appears in the shape of a crown, the outer surface being provided with a bevel. To grip the cap, the cap-holding nose is placed in the central opening of the cap. At this moment, air is introduced into the inner pipes 68 to inflate the membrane which is then applied on the inner surface of the central opening of the cap. The wrist of the robot then moves to present itself opposite the edge of the reel. Position switch 88 detects two points of the hollow spindle of the reel which determines the center of the reel. The wrist of the robot then swivels to present the cap opposite the spindle.

Rod 73 is then activated by an input of air under pressure through opening 102, this input of air being controlled by a solenoid valve. The cap, guided by the bevel that it exhibits on its outer surface is then driven into the spindle, pushed by lower face 89 of nut 66. At the same time, elastic membrane 67 is deflated through the opening of the solenoid valve connected to the air supply pipe. The solenoid valve controlling the arrival of air over the head of rod 73 is also open and rod 73 returns under the thrust of spring 80. By reactivating the solenoid valve, air is reintroduced to assure the driving of the cap by one or possibly more striking blows. The reaction to the impact of these blows is absorbed by spring 77 placed between cylinder 74 and counter-cylinder 75. With the cap in place, the wrist of the robot disengages and swivels to present the marking head opposite the edge of the reel, the aligned marking nozzles being oriented along a radial axis of the reel. The head is applied against the edge and it is guided particularly by balls 58 which keep it at the desired marking distance. The wrist of the robot is then moved so that the marking head describes an arc of a circle around the center of the reel determined previously by contactor 88 before the capping previously described. During the movement of the marking head, the nozzles are supplied with ink in a programmed, sequenced manner so as to define printing characters, a character being defined, for example, by the action of 7 or 14 neighboring nozzles. During the movement of the head, it is kept at a fixed distance from the edge of the reel due to the guiding device including balls 58 and to the damping system on which it is mounted.

When the marking of the edge is completed, the wrist of the robot disengages the marking head and brings it to the edge of the reel. Position switch 88 locates the roll and the wrist places the marking head on top of it. Jack 60 controlling the outward movement of the casters 59 is activated and the marking head is placed in the correct position, the casters resting on the edge of the reel while balls 58 rest on the roll. The marking of the roll is then done like the marking of the edge, the nozzles being supplied with ink in a programmed and sequenced manner. During the movement of the marking head, the damping system compensates for the deviations between the programmed course of robot wrists and the desired and exact path provided by the guiding system with casters and balls.

In a device being equipped with two detectors, a second reel placed opposite the first can be worked on in the same way.

Obviously, numerous modifications and variations of the present invention are possible in light of the above teachings. It is therefore to be understood that within the scope of the appended claims, the invention may be practiced otherwise than as specifically described herein.

We claim:

1. An automatic product processing device comprising:
   an industrial robot having a wrist preprogrammable for movement along a first path, said movement comprising incremental movements along up to three orthogonal directions;
   a printing system including means for guiding said printing system along a second path defined by a product to be processed, said means for guiding including means for contacting at least one surface of said product and tracing said surface as said printing system moves along said second path; and
   means for connecting said printing system to said robot wrist, said means for connecting including means for compensating for differences between said first and second paths such that said robot wrist follows said first path and said working system follows said second path.

2. Automatic device as in claim 1, wherein the means for guiding comprises a feeler which rests on at least one surface of the product to be processed.

3. Automatic device as in claim 2, wherein the feeler rests on the surface to be processed.

4. Automatic device as in claim 1, wherein said product comprises a paper reel.

5. Automatic device as in claim 4, wherein the guiding device is constructed so as to use as a reference the edge of the paper reel in case of marking on a roll of said reel.

6. Automatic device as claim 4 including a position switch for locating the center of the reel, whereby it is possible to mark in an arc of a circle centered on said reel center.

7. Automatic device as in claim 4 wherein said means for guiding comprises balls supported relative to said printing system, said balls serving as a touching point on the surface to be marked, and casters supported relative to said working system at a position which, in case of marking on a roll of said reel, rest on the edge of said roll.

8. Automatic device as in claim 1, wherein said means for compensating provide compensation in two linear directions perpendicular to each other and two circular directions relative to the printing system.

9. The automatic device of claim 1 wherein said printing system includes ink jet printing means.

10. Automatic device as in claim 1 including a capping system associated with said printing system, said capping system using said guiding means for the positioning thereof.

11. Automatic device as in claim 10, wherein the capping system includes impact damping means.

* * * * *